United States Patent [19]

Kondou

[11] Patent Number: 5,080,916

[45] Date of Patent: *Jan. 14, 1992

[54] LOW-CALORIC SWEETENING COMPOSITION OF MICROCRYSTALLINE APPEARANCE

[75] Inventor: Tsutomu Kondou, Sagamihara, Japan

[73] Assignees: Mitsubishi Kasei Corporation; Nikken Chemicals Company, Limited, both of Japan

[*] Notice: The portion of the term of this patent subsequent to Feb. 20, 2007 has been disclaimed.

[21] Appl. No.: 504,084

[22] Filed: Mar. 30, 1990

Related U.S. Application Data

[63] Continuation of Ser. No. 289,989, Dec. 22, 1988, abandoned.

[30] Foreign Application Priority Data

Dec. 28, 1987 [JP] Japan .................. 62-329429

[51] Int. Cl.⁵ .............................. A23L 1/236
[52] U.S. Cl. ..................... 426/96; 426/548; 426/658
[58] Field of Search ........... 426/96, 548, 658, 656, 426/657

[56] References Cited

U.S. PATENT DOCUMENTS

| | | | |
|---|---|---|---|
| 3,617,302 | 11/1971 | Collins | 426/302 |
| 3,653,922 | 4/1972 | Schmitt et al. | 426/658 |
| 3,704,138 | 11/1972 | La Via et al. | 426/548 |
| 3,950,549 | 4/1976 | Newton et al. | 426/96 |
| 4,304,794 | 12/1981 | Dwivedi et al. | 426/548 |
| 4,758,438 | 7/1988 | Stroz et al. | 426/3 |
| 4,770,889 | 9/1988 | Sakai et al. | 426/548 |
| 4,886,677 | 12/1989 | Kondou | 426/548 |
| 4,902,525 | 2/1990 | Kondou | 426/548 |

FOREIGN PATENT DOCUMENTS 0009325 4/1980 European Pat. Off. .
63-258557 10/1988 Japan .

OTHER PUBLICATIONS

Inglett, Symposium: Sweeteners 1974 pp. 136-137.
Stecher et al., The Merck Index, Eighth Edition, 1968, p. 418, Merck and Co., Inc., Rahway, NJ.

Primary Examiner—Donald E. Czaja
Assistant Examiner—Leslie Wood
Attorney, Agent, or Firm—Jordan B. Bierman

[57] ABSTRACT

A low-caloric sweetening composition of micro-crystalline appearance comprises microcrystalline mesoerythritol particles whose surface is coated with a sweetening component containing at least one nonsugar sweetener, an amount of which is adjusted to within ranges from 9.4 to 2.6, preferably 6.5 to 2.6, with respect to a product of a weight part of the nonsugar sweetener per weight part of the mesoerythritol as one and a relative sweetness of the nonsugar sweetener to a sucrose. When plural nonsugar sweeteners are contained, the product is calculated as a sum of the products obtained in terms of each nonsugar sweetener.

5 Claims, No Drawings

LOW-CALORIC SWEETENING COMPOSITION OF MICROCRYSTALLINE APPEARANCE

This application is a continuation of application Ser. No. 289,989, filed Dec. 22, 1988, now abandoned.

FIELD OF THE INVENTION

This invention relates to a low-caloric and non-cariogenic sweetening composition of microcrystalline appearance.

BACKGROUND OF THE INVENTION

Nonsugar sweeteners such as aspartame, stevioside, saccharin sodium, thaumatin, glycyrrhizin, acesulfam-K and sodium cylcamate, which are several hundreds of times as sweet as sucrose, are low-caloric and non-cariogenic. Thus the application ranges of these nonsugar sweeteners have been more and more extended as substitutes for sugar which is somewhat injurious to health.

However each of these nonsugar sweeteners has an extremely high sweetness which makes it almost impossible to employ the same alone for home use. Therefore the nonsugar sweetener is generally blended with fillers to thereby give a powder, or is sometimes further molded into an appropriate shape together with excipients. However these products thus obtained are similar to powdered or granulated drugs in appearance and thus are not accepted as conventional sweeteners.

On the other hand, sugar alcohols such as sorbitol, maltitol and xylitol having excellent sweetness characteristics are widely used as non-digestive, i.e., low-caloric and non-cariogenic sweeteners. There are known sweetening compositions comprising a mixture of these sugar alcohols with nonsugar sweeteners such as aspartame, stevioside or saccharin sodium. However, recent studies on rat, dog and human being suggest that these sugar alcohols would be decomposed and absorbed to a considerably high extent in vivo and thus the sugar alcohols are almost comparable to sucrose in caloric value. That is to say, these sugar alcohols are metabolized by enteric bacteria to thereby supply energy. In addition, these mixtures of sugar alcohols and nonsugar sweeteners have a drawback in appearance which shows similar to powdered or granulated drugs, as described above.

The inventors have previously proposed an invention on a taste modifier for a nonsugar sweetener (JP-A-63 258557, the term "JP-A" herein used means unexamined Japanese patent application). According to the prior invention, one part by weight of mesoerythritol is preferably blended with, for example, 0.001 to 0.007 part by weight of stevioside, 0.001 to 0.004 part by weight of glycyrrhizin, 0.001 to 0.014 part by weight of aspartame or 0.0004 to 0.001 part by weight of saccharin sodium. The inventors have further proposed a low-caloric sweetening composition wherein a surface of microcrystalline particles of mesoerythritol is coated with a sweetening component containing at least one nonsugar sweetener (see JP-A-I-95741 and JP-A-I-98457). In the case of the two prior inventions, a mesoerythritol is preferably blended with a nonsugar sweetener at the same ratio as those defined above.

Thus a sweetening composition similar to sucrose in sweetness characteristics can be obtained by blending mesoerythritol with a nonsugar sweetener at the ratio defined above. However, the inventor have subsequently found that the mesoerythritol contained in a large amount in a sweetening composition, which is obtained by blending mesoerythritol and a nonsugar sweetener so as to give a sweetness characteristics similar to those of sucrose, would require heat dissolution when added to hot coffee or hot tea, thereby resulting in a significant decreasing a temperature of the hot coffee or hot tea. Therefore the above sweetening composition is impossible to add to hot coffee or hot tea in the same manner as that employed in the case of sugar.

SUMMARY OF THE INVENTION

The present invention aims at providing a low-caloric and non-cariogenic sweetening composition which has a beautiful microcrystalline appearance similar to that of granulated sugar (sucrose) and causes little decrease in temperature when added to hot coffee or hot tea.

According to the present invention, there is provided a low-caloric sweetening composition of microcrystalline appearance comprising microcrystalline mesoerythritol particles whose surface is coated with a sweetening component containing at least one nonsugar sweetener, an amount of which is adjusted to within ranges of from 9.4 to 2.6, preferably 6.5 to 2.6 with respect to a product of a weight part of the nonsugar sweetener per weight part of the mesoerythritol as one and a relative sweetness of the nonsugar sweetener to a sucrose. When plural nonsugar sweeteners are contained, the product of the weight part of the nonsugar sweetener per weight part of the mesoerythritol is defined as a sum of the products obtained in terms of each nonsugar sweetener.

In other words, the amount of non-sugar sweetener present satisfies the relationship

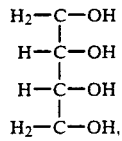

$$\frac{Wns}{Wm} \times \frac{Sns}{Ss} = 9.4 \text{ to } 2.6$$

wherein Wns is the amount of non sugar sweetener in parts by weight, Wm is the parts by weight of mesoerythritol, and Sns/ss is the relative sweetness of the non-sugar sweetener compared to that of sucrose. In the preferred form of the device, the product of the two ratios falls within the range of 6.5 to 2.6.

DETAILED DESCRIPTION OF THE INVENTION

The mesoerythritol to be used in the present invention is a tetrahydric sugar alcohol represented by the following formula:

$$\begin{array}{c} H_2-C-OH \\ | \\ H-C-OH \\ | \\ H-C-OH \\ | \\ H_2-C-OH, \end{array}$$

which has a form of white crystals, a molecular weight of 122 and m.p. of 119° C. The mesoerythritol is closely similar to granulated sugar in appearance, highly soluble in water, nondigestive and non cariogenic and shows no browning in appearance. The mesoerythritol, which will be sometimes simply called erythritol hereinafter, occurs in natural algae and fungi, and is contained in a small amount in Japanese sake, wine and soy sauce. A panel test indicates that the sweetness of mesoerythritol is somewhat lower than that of sucrose and somewhat higher than that of glucose; the sweetness of mesoerythritol corresponds to approximately 75 to 80% of that of sucrose; and the sweetness characteristics of mesoerythritol are similar to those of sucrose but the former gives less aftertaste than the latter does.

The particle size of the erythritol microcrystalline particles to be used in the present invention is not particularly restricted, and preferably ranges from approximately 0.1 to 1.0 mm. Erythritol microcrystalline particles whose particle size is similar to that of granulated sugar, i.e., 0.2 to 0.7 mm, to that of refined white sugar, i.e., 0.1 to 0.2 mm or to that of powdered sugar, i.e., 0.1 mm or below may be employed.

The relative sweetness of a nonsugar sweetener described herein means the degree of the sweetness of the nonsugar sweetener based on that of sucrose. A value is calculated according to the following equation:

$$\text{Relative sweetness to sucrose} = \frac{7 \ (\% \ \text{by weight})}{C \ (\% \ \text{by weight})};$$

wherein C represents the concentration in weight percent of an aqueous solution of the nonsugar sweetener which shows a sweetness comparable to that of a 7% by weight aqueous solution of sucrose.

As described above, the low-caloric sweetening composition of the present invention satisfies the product of range from 9.4 to 2.6, which is obtained from the content (part by weight) of said nonsugar sweetener per part by weight of the mesoerythritol and the relative sweetness of said nonsugar sweetener based on that of sucrose, and when two or more nonsugar sweeteners are employed, the product means a sum of the product of each nonsugar sweetener. The above product or the sum thereof ranging from 9.4 to 2.6 makes it possible to prevent any significant decrease in temperature of hot coffee or hot tea, generally speaking heated water or aqueous solution. When the product or the sum thereof exceeds 9.4, the resulting sweetening composition shows an excessively higher sweetness which makes an application thereof difficult. In addition, some nonsugar sweeteners would damage the vitrous appearance of the erythritol crystals to thereby injure the appearance of the sweetening composition.

Examples of the nonsugar sweeteners to be used in the present invention are as follows. Values in parentheses indicate each the relative sweetness of the nonsugar sweetener based on that of sucrose as 1.

aspartame (118),
stevioside (233),
saccharin sodium (240),
thaumatin (2920),
glycyrrhizin (160),
acesulfam-K (150) and
sodium cyclamate (33).

The sweetening component containing at least one nonsugar sweetener, which is to be used in coating erythritol microcrystalline particles in the present invention, may comprise nonsugar sweetener(s) optionally together with sugar sweetener(s) or gelatinizer(s).

Various sugar sweeteners may be used together with the nonsugar sweetener(s) in the present invention. Particularly preferably examples thereof include those having high water holding properties such as reduced straight-chain oligosaccharides, branched oligosaccharide alcohols, sorbitol, coupling sugars, isomerized sugars and maltitol.

Examples of the gelatinizer, binder, to be used together with the nonsugar sweetener(s) include gelatin, locustbean gum, carrageenan, xanthan gum pullulan and soluble starch.

In the present invention, the erythritol microcrystalline particles may be coated by various methods. For example, the coating may be effected by spraying an aqueous liquor (the term "aqueous liquor" used herein means an aqueous solution as well as an aqueous dispersion) comprising nonsugar sweetener(s) optionally together with gelatinizer(s) onto the surface of erythritol microcrystalline particles; or by kneading the abovementioned aqueous liquor of the sweetening component comprising nonsugar sweetener(s) and optionally gelatinizer(s) together with the erythritol microcrystalline particles in a kneader and the like.

Subsequently the erythritol microcrystalline particles whose surface is thus coated with the sweetening component may be dried by, for example, vacuum-drying or air-drying preferably at a temperature of 50° to 110° C.

In the low-caloric sweetening component of microcrystalline appearance of the present invention, it is not always required that the coating layer comprising the sweetening component is completely dried. When the sweetening component comprises nonsugar sweetener(s) together with the abovementioned sugar(s) of high water holding properties, in particular, moisture may remain in the coating layer to a certain extent. This is because such a sweetening composition as described above, wherein the coating layer comprises sugars having high water retention properties and contains some moisture, would never aggregate to form lump when packed in bags and piled in a storehouse. Furthermore it is sometimes observed that the presence of some moisture therein effectively prevents the erythritol microcrystals from being powdered when exposed to shaking or shock during the transportation of the product.

In the present invention, the ratio between mesoerythritol and a nonsugar sweetener, which gives the product of the content (part by weight) of said nonsugar sweetener per part by weight of the erythritol and the relative sweetness of said nonsugar sweetener ranging from 6.5 to 2.6, may vary depending on nonsugar sweetener. For example, 0.055 to 0.022 part by weight of aspartame, 0.027 to 0.011 part by weight of stevioside, 0.027 to 0.011 part by weight of saccharin sodium, 0.0022 to 0.0009 part by weight of thaumatin, 0.041 to 0.016 part by weight of glycyrrhizin 0.042 to 0.017 part by weight of acesulfam-K or 0.197 to 0.079 part by weight of sodium cyclamate may be used each per part by weight of erythritol.

As an embodiment, mixtures of erythritol and stevioside at various ratios are dissolved in water to thereby give aqueous solutions each having a sweetness comparable to that of a 7% by weight or 14% by weight aqueous solution of sucrose. Then the decrease in the water temperature caused by the dissolution of each mixture is examined. Table 1 shows the results.

TABLE 1

| Sample No. | 1 | 2 | 3 | 4 | 5 |
| --- | --- | --- | --- | --- | --- |
| Composition: | | | | | |
| stevioside (part by weight) | 0.027 | 0.0258 | 0.0246 | 0.0084 | 0.0054 |
| erythritol (part by weight) | 1.0 | 1.5 | 2.0 | 6.7 | 7.8 |
| stevioside/erythritol (a) | 0.027 | 0.017 | 0.012 | 0.001 | 0.0007 |
| a × 233* | 6.3 | 4.00 | 2.80 | 0.23 | 0.16 |
| Decrease in water temperature at | | | | | |

TABLE 1-continued

| Sample No. | 1 | 2 | 3 | 4 | 5 |
|---|---|---|---|---|---|
| dissolution | | | | | |
| sweetness corresponding to that of 7% by weight solution of sucrose | 0.4 | 0.7 | 0.9 | 3.1 | 3.6 |
| sweetness corresponding to that of 14% by weight solution of sucrose | 0.9 | 1.3 | 1.8 | 6.2 | 7.3 |

*233 is the specific sweetness of stevioside based on sucrose.

The amount of a sweetener too be added to, for example, coffee or tea varies from person to person. However a sweetness comparable to that of a 14% by weight aqueous solution of sucrose is sufficient for even those who prefer a strong sweet taste. A decrease in the temperature of hot coffee or hot tea by 1° to 2° C., caused by the dissolution of a sweetener added thereto, would offer significantly no problem. Accordingly the sample Nos. 1 to 3 in Table 1, each having the product of a and 140 within 6.5 to 2.6, satisfy these requirements. In contrast thereto, the sample Nos. 4 and 5, each having the product of a×233 less than 2.6, cause an undesirable decrease in the temperature, namely by 3° C. or more.

It is also undesirable that the ratio of a nonsugar sweetener to erythritol is excessively high. When the surface of erythritol crystals having 0.2 to 0.7 mm in particle size is coated with a large amount of powdered aspartame, for example, a vitreous and transparent appearance of the erythritol crystals is injured. As a result, the obtained sweetening composition looked like broken crystals. In addition, the sweetness of the sweetening composition is several ten times as high as that of sugar, which makes the application thereof difficult. In contrast thereto, according to the sweetening composition of the present invention, when the content of the nonsugar sweetener is relatively small and thus the product defined above is 6.5 or below, erythritol crystals coated with the powdery aspartame maintains the vitreous and transparent appearance and shows a relatively low sweetness. Thus it is highly preferable.

The sweetening composition of the present invention is particularly suitable as a sweetener for hot drinks such as hot coffee or hot tea. Further, the the sweetening composition is available as a material in the production of a molded sugar product which has been priorly applied for a patent by us cf. Japanese Patent Application No. 62-262709.

The sweetening composition of the present invention has a beautiful microcrystalline appearance just like granulated sugar (sucrose) and is low-caloric and non-cariogenic. Further it causes little decrease in temperature when added to a hot drink.

To further illustrate the present invention, the following Examples which are not to be construed as limiting the scope thereof will be given. Unless otherwise indicated, all pats, percents and ratios are by weight.

EXAMPLE 1

An aqueous liquor obtained by dispersing/dissolving 15 g of a saccharin sodium powder in 50 g of water was added to 1 kg of erythritol microcrystalline particles having a particle size of 0.1 to 1 mm. The resulting mixture was thoroughly kneaded in a kneader to thereby coat the surface of the erythritol microcrystalline particles with the saccharin sodium. In this case, the product of the content (by weight) of the saccharin sodium per part by weight of the erythritol and the specific sweetness thereof to that of sucrose having specific sweetness of 240 was 3.6.

The kneaded mixture was air-dried at 80° C. The sweetening composition thus obtained had a beautiful microcrystalline appearance just like granulated sugar (sucrose) and was low-caloric and non-cariogenic. 1.52 g of this sweetener was dissolved in 98.50 g of a solution of instant coffee at 70° C. Thus a sweetness comparable that of a 7% by weight aqueous solution of sucrose was achieved accompanied by little decrease in the temperature of the coffee.

EXAMPLE 2

35 g of aspartame was thoroughly kneaded together with 25 g of a solution of a reducing straight-chain oligosaccharide (concentration: approximately 70% by weight). Then 1 kg of microcrystalline erythritol particles of 0.1 to 0.2 mm in particle size were added thereto. The resulting mixture was thoroughly kneaded in a kneader.

The sweetening composition thus obtained, which comprised erythritol microcrystalline particles coated with the mixture of aspartame and the reducing straight-chain oligosaccharide, had a beautiful microcrystalline appearance and was low-caloric and non-cariogenic. 15.5 Gram of this sweetening composition was dissolved in 98.5 g of a solution of instant coffee at 70° C. Thus a sweetness comparable to that of a 7% by weight aqueous solution of sucrose was achieved accompanied by little decrease in the temperature of the coffee.

While the invention has been described in detail and with reference to specific embodiments thereof, it will be apparent to one skilled in the art that various changes and modifications can be made therein without departing from the spirit and scope thereof.

What is claimed is:

1. A sweetening composition of microcrystalline appearance comprising microcrystalline mesoerythritol particles whose surfaces are coated with an amount of a sweetening component containing at least one non-sugar sweetener, said amount satisfying the relationship $$\frac{Wns}{Wm} \times \frac{Sns}{Ss} = 9.4 \text{ to } 2.6$$

wherein Wns is the parts by weight of said non-sugar sweetener, Wm is the parts by weight of said mesoerythritol, and Sns/ss is the relative sweetness of said non-sugar sweetener compared to that of sucrose.

2. The composition of claim 1 wherein said relationship is $$\frac{Wns}{Wm} \times \frac{Sns}{Ss} = 6.5 \text{ to } 2.6$$

3. The composition of claim 1 wherein said composition is low calorie and non-cariogenic.

4. The composition of claim 1 wherein said non-sugar sweetener is saccharin sodium.

5. The composition of claim 1 wherein said non-sugar sweetener is aspartame.

* * * * *